United States Patent
Stengel

(10) Patent No.: US 9,103,488 B2
(45) Date of Patent: Aug. 11, 2015

(54) MULTI-POSITION ARTICULATED DISPLAY SUPPORT SYSTEM

(71) Applicant: Jasen A. Stengel, Columbia, MD (US)

(72) Inventor: Jasen A. Stengel, Columbia, MD (US)

( * ) Notice: Subject to any disclaimer, the term of this patent is extended or adjusted under 35 U.S.C. 154(b) by 0 days.

(21) Appl. No.: 13/708,829

(22) Filed: Dec. 7, 2012

(65) Prior Publication Data

US 2013/0112829 A1    May 9, 2013

Related U.S. Application Data

(63) Continuation-in-part of application No. 12/455,981, filed on Jun. 10, 2009, now Pat. No. 8,356,779.

(51) Int. Cl.
| | |
|---|---|
| *A47B 21/00* | (2006.01) |
| *A47B 96/06* | (2006.01) |
| *F16M 13/02* | (2006.01) |
| *A47B 81/06* | (2006.01) |
| *A47B 21/03* | (2006.01) |
| *A47B 21/007* | (2006.01) |

(52) U.S. Cl.
CPC .............. *F16M 13/022* (2013.01); *A47B 21/00* (2013.01); *A47B 21/0073* (2013.01); *A47B 81/061* (2013.01); *A47B 21/007* (2013.01); *A47B 21/0314* (2013.01); *A47B 2021/0364* (2013.01)

(58) Field of Classification Search
CPC .. A47B 21/007; A47B 21/0073; A47B 21/02; A47B 21/03; A47B 21/0314; A47B 2021/0335; A47B 2021/0364
USPC ........ 248/274.1, 279.1, 287.1, 295.11, 298.1, 248/917, 371; 108/50.01, 97, 6, 10, 102, 108/106, 109, 147; 312/223.3
See application file for complete search history.

(56) References Cited

U.S. PATENT DOCUMENTS

| | | | | |
|---|---|---|---|---|
| 5,082,037 | A * | 1/1992 | Hammons et al. | 144/286.5 |
| 5,765,797 | A * | 6/1998 | Greene et al. | 248/398 |
| 5,857,415 | A * | 1/1999 | Richard | 108/50.01 |
| 6,077,004 | A * | 6/2000 | Denman, Jr. | 410/8 |
| 6,913,332 | B1 * | 7/2005 | Besterfield et al. | 312/223.3 |
| 7,721,658 | B2 * | 5/2010 | Seeley et al. | 108/50.01 |
| 8,356,779 | B2 * | 1/2013 | Stengel | 248/125.3 |
| 8,371,237 | B2 * | 2/2013 | Weber | 108/97 |
| 2013/0112829 | A1 * | 5/2013 | Stengel | 248/297.31 |

* cited by examiner

*Primary Examiner* — Tan Le

(74) *Attorney, Agent, or Firm* — Robert Field; Conwell Law LLC

(57) ABSTRACT

An articulated display support system designed to securely support a flat panel display (including touch-screen and digital type displays) affixed to a work surface in a semi-recessed, subsurface or super-surface configuration. The mounting system allows the display to be tilted for optimal ergonomics. One embodiment offers manual adjustment with multiple locking stop-points for horizontal (front-to-back) positioning to optimally place the monitor for touch screen applications. While the lock is engaged, the monitor is stable enough for touch screen and digitizer pen usage. Another embodiment utilizes an actuator for horizontal (front-to-back) positioning to optimally place the monitor for touch screen applications. The display support system allows adjustment within a preset range by the user, while also providing the ability to limit further adjustment beyond this range or removal of the monitor itself to designated personnel. The display mount is fixedly attached to the work surface offering security and ergonomic advantages.

4 Claims, 11 Drawing Sheets

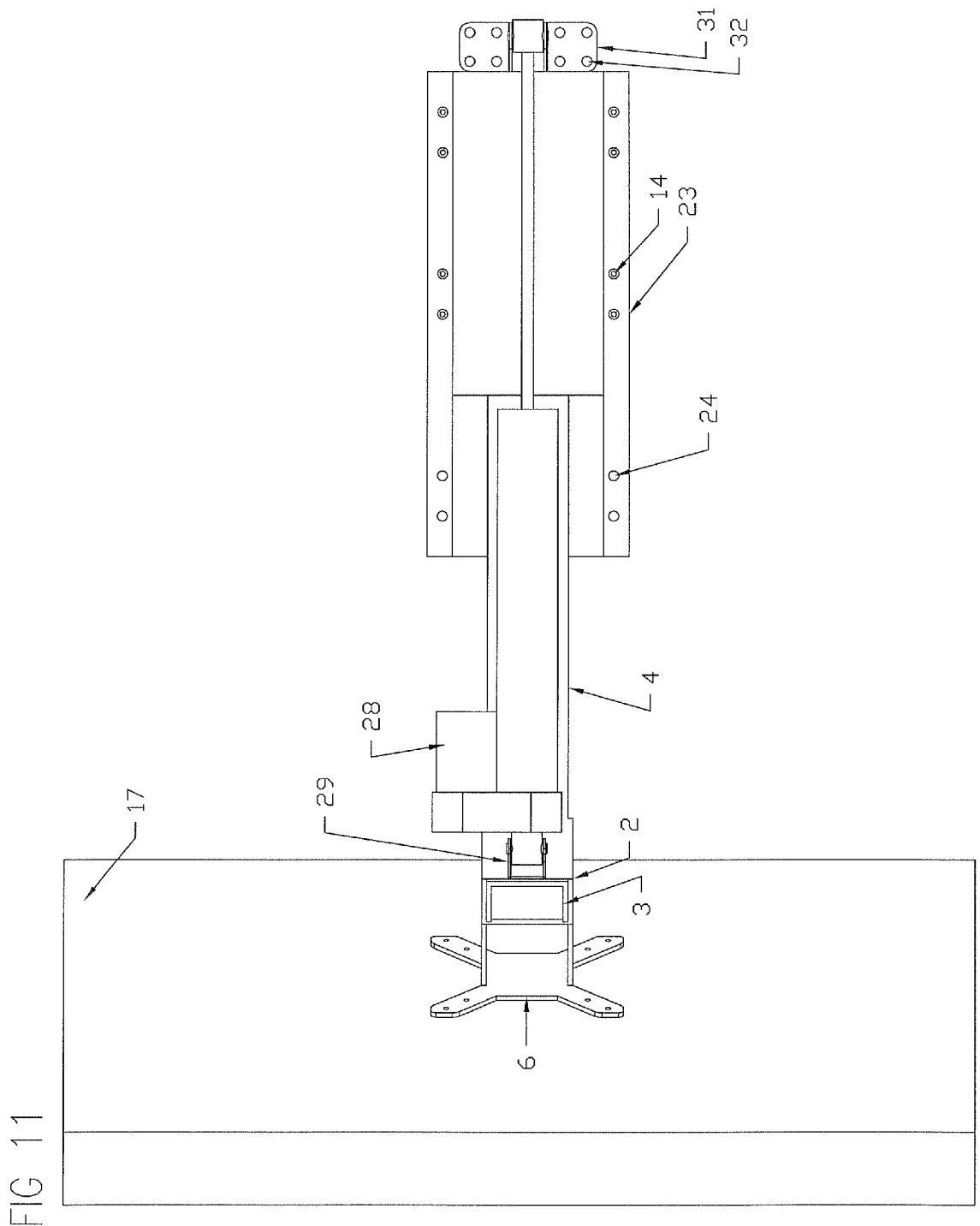

MULTI-POSITION ARTICULATED DISPLAY SUPPORT SYSTEM

CROSS-REFERENCE TO RELATED APPLICATION

This application is a continuation-in-part of application Ser. No. 12/455,981, filed Jun. 10, 2009, entitled "Fixed Flat Panel Monitor Mounting System".

BACKGROUND OF THE INVENTION

1. Field of the Invention

This invention relates to an articulated device for supporting a flat panel display (including touch-screen and digital type displays) above a work surface with a secure adjustable attachment permitting vertical and horizontal (front to back) adjustment which allows for proper ergonomic positioning with sufficient stability to allow the use of touch-screen control with the ability to allow adjustment within a pre-set range by the user, while also providing the ability to limit further adjustment beyond this range or removal of the monitor itself to designated personnel.

2. Background of the Invention

There are many commercially available computer and monitor mounting and support systems available on the market. These designs are based upon the need of the user, and the computer equipment that will be used. One style is described in published U.S. Pat. No. 7,047,890, B1 (Korber, Stengel et al.) and U.S. Pat. No. 7,509,912, B2, (Stengel et al.) which describe a flat panel workstation system which incorporates the means for supporting and pivoting a flat panel display such as a liquid crystal display (LCD) from a closed position to an open, viewable position in front of a user. Other furniture and equipment interface designs have various benefits and/or disadvantages with regard to ergonomics, usability, practicality, cost and applicability to various technologies.

Various means to mount a flat screen monitor to a work surface are known in the art. U.S. Pat. No. 4,766,422, (Wolters et al.) discloses a computer desk which enables the user to raise a flat screen display from beneath a work surface. U.S. Pat. No. 5,957,059, (Burhman) discloses a computer desk which includes a mount for various monitors, including a flat panel. U.S. Pat. Nos. 5,651,594, 5,699,744 5,964,164, 6,092,883, 6,135,298, 6,431,377, (Lechman) disclose flat monitor attachments to a work station inset into the work platform so as not to interfere with the use of the work surface and displayed under a transparent work surface. U.S. Pat. No. 6,128,186, (Feierbach) discloses a workstation incorporating an integrated flat screen monitor which can be folded into a closed position where the viewing area is protected. U.S. Pat. No. 6,168,250, (Rogav) includes a flat panel monitor mounting assembly that allows the monitor to be rotated such that the monitor can be viewed in either a vertical or horizontal viewing position. U.S. Pat. No. 6,237,507, (Yanagisawa et al.) discloses a desk in which a flat panel monitor can be rotated into about a rotational axis. U.S. Pat. No. 6,286,440, (Jyringi) includes a desk with integrated computer components which includes a flat panel monitor component inset into the desk. U.S. Pat. No. 5,474,760, (Rauls) discloses a multifunction drawer for a desk that provides an adjustable platform, to which a flat panel monitor can be attached. U.S. Pat. No. 6,553,919 (Nevin) discloses a computer desk with a concealable flat panel display. U.S. Pat. No. 6,609,465, (Kolavo) discloses a multipurpose table to which a flat panel display can be mounted and raised to a user-determined position.

U.S. Design Pat. Nos. D429,088,, D429,579,, D438,401, (Lechman) disclose multiple station surface workstation units which can include a flat panel display and U.S. Design Pat. Nos. D437,506, and D440,069, (Lechman) disclose single work surface workstation units which can include a flat panel display. U.S. Pat. No. 7,047,890, B1, (Korber, Stengel et al.) and U.S. Pat. No. 7,509,912, B2, (Stengel et al.) disclose a method and system for holding and displaying a flat panel display monitor. U.S. Design Pat. D541,084, (Korber and Stengel) discloses a conference table with multiple workstations.

U.S. Pat. No. 7,267,314, B1, (Erickson) describes a monitor mount designed to hang from the ceiling mount designed for display monitors to be viewed by audiences. It is adjustable vertically and can be angled to face the audience. However, it is designed strictly for viewing by an audience and not for interactive use with a user.

SHORTCOMINGS OF THE EXISTING ART

None of the existing prior art discloses or describes an articulated device for supporting a flat panel display (including touch-screen and digital type displays) above a work surface with a secure adjustable attachment permitting vertical and horizontal (front to back) adjustment which allows for proper ergonomic positioning with sufficient stability to allow the use of touch-screen control with the ability to allow adjustment within a pre-set range by the user, while also providing the ability to limit further adjustment beyond this range or removal of the monitor itself to designated personnel. Security issues often drive decisions concerning costly equipment. There exists a need to optimize the best computer monitor location, based on personal preference, several environmental criteria, ergonomics and security of the monitor.

SUMMARY OF THE INVENTION

The present invention is drawn to an articulated fixed flat panel display mounting system designed for strength and security as well as adjustability. The design of the invention allows any flat panel display to be fixedly and securely mounted to a solid surface such as a work-surface with limited horizontal (front to back) adjustment by the user while being fully adjustable by authorized personnel with the use of special tools whose distribution may be limited to selected individuals. The height can be adjusted upon installation and fixed in place with security screws. The user of the display would be able to adjust the angle and, to a limited extent, the horizontal (front to back) position of the display only. The mount of the invention would be superior to the standard monitor stands because it is affixed and secured to the work surface and cannot be misaligned while still permitting desired angular and limited horizontal adjustment. It is also superior to standard monitor arms because it locks in position to remove undesirable play in the mounting system which is undesirable in a device which might be controlled by touching or swiping. But in spite of its security features it can be used in a number of configurations including semi-recessed, subsurface and super-surface positions and is fully adjustable by the use of appropriate tools.

BRIEF DESCRIPTION OF THE FIGURES

FIGS. 9-11 show another embodiment of the invention where the horizontal (front to back) adjustment is power-assisted.

DETAILED DESCRIPTION OF THE INVENTION

Figure 1:
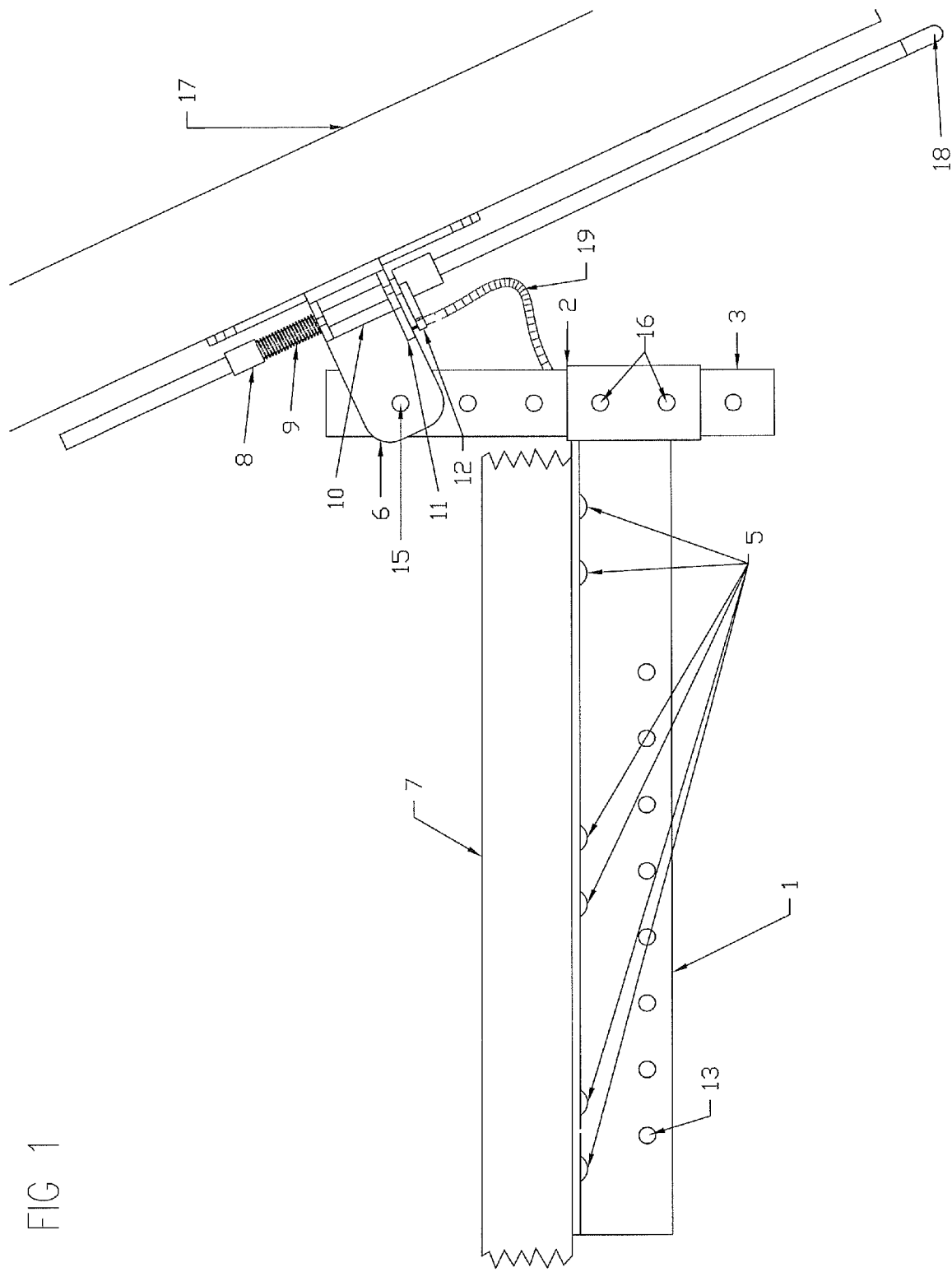
FIGS. 1-6 show one embodiment of the invention which is adjustable device for mounting a display device to a work surface whereby the position of the display device may be adjusted between fixed positions both vertically and horizontally (front to back).
Figure 2:
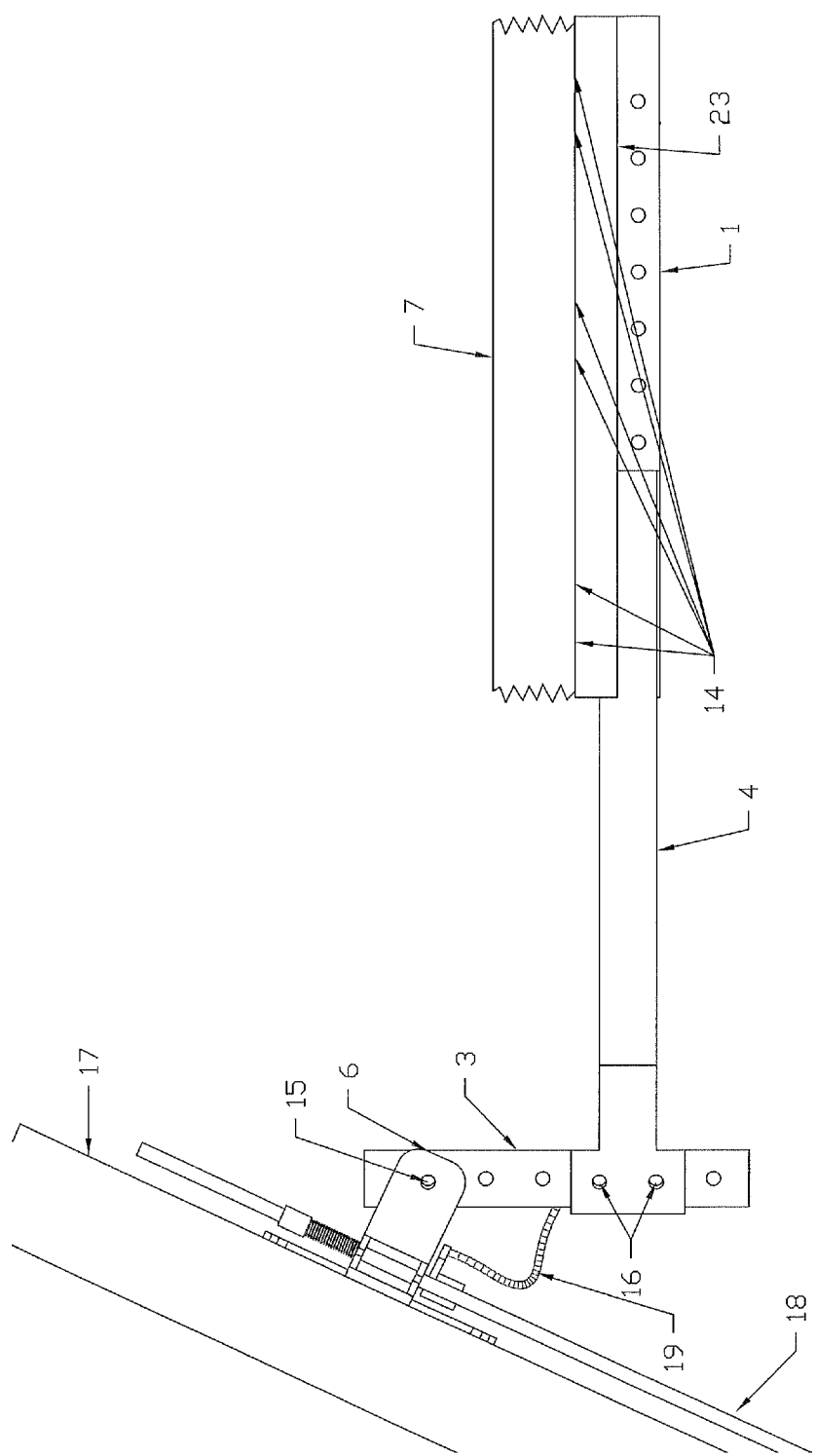

The present invention is an articulated device for supporting a flat panel display (including touch-screen and digital type displays) affixed to a work surface and which is designed for strength, flexible adjustment and security. The target market would be all users of touch screen or digital displays such as active pen drawings and governmental, institutional or educational users with a need for a stable, horizontally (front to back) adjustable mounting system for a monitor. Other possible users envisioned would be military, kiosk, industrial, commercial or residential uses or other places that need a secure but adjustable fixed mount for a monitor.

The present invention includes a VESA-compatible or other industry standard or custom flat panel mounting system which can be used in any commercially-available work surface or workstation configurations, including, but not limited to single or multiple workstations, existing desks or tabletops, lectern or speakers' podiums, study carrels, library or classroom desks and tables, office or conference room work surfaces, tables, desks or modular work areas. It would be compatible with any industry standard attachments currently in use or developed in the future.

Video Electronics Standards Association (VESA) supports and sets industry-wide interface standards for the PC, workstation, and consumer electronics industries. VESA promotes and develops timely, relevant, open standards for the display and display interface industry, ensuring interoperability and encouraging innovation and market growth. VESA defines the requirements for the standardization of mechanical dimensions and selected electrical interface requirements panels intended for use as LCD monitors, designed to operate from various voltage sources, including 5, V and 12, V. This enables LCD manufacturers and panel consumers to better control supply and demand cycles. The intent is that panels built to VESA specification will be able to be used in most applications without requiring alterations in either the product tooling or the display module.

"Flat panel display" as used herein encompasses video displays that are lighter and much thinner than cathode ray (CRT) video displays that use cathode ray tubes, and are usually less than 4, inches (100, mm) thick including touch screen displays, tablets and all other types of digitizing displays. Flat panel displays usually require continuous refresh. These include, but are not limited plasma displays, liquid crystal displays (LCDs), organic light-emitting diode displays (OLEDs), light-emitting diode display (LED), electroluminescent displays (ELDs), surface-conduction electron-emitter displays (SEDs), field emission displays (FEDs), nano-emissive display (NEDs), and digital light processing (DLP). Other flat panel technologies include, but are not limited to bistable flat panel displays, also known as electronic paper displays, which includes, but are not limited to electrophoretic displays (such as E Ink's electrophoretic imaging film), bichromal ball displays (such as Gyricon (Xerox)),interferometric modulator displays (such as. iMod, a MEMS display (Qualcomm)), cholesteric displays (such as, kent displays (MagInk)), and bistable nematic liquid crystal displays (ZBD).

The size of monitors of the invention includes but is not limited to 9, 11, 15, 17 19, 20, 21, 24 and 30, inch industry standard sized LCD monitors, or any other size known in the art. The invention also includes plasma monitors, or other flat panel display types as known in the art.

The VESA mounting configurations described in the invention are not limited to those that are shown. Adjustments, changes and adaptions to reflect new manufacturers and standards to said invention can be made, according to those of skill in the art. The security screws or hardware described throughout the invention can be replaced by other hardware known in the art and which provides suitable functionality. The VESA compatible mounting plate can be replaced with any mounting plate which meets other panel display mounting requirements. The VESA standard hole placement of 100, mm and 75, mm on each side for vertical and horizontal hole separation can be changed to accommodate any changing display mounting requirements and still be within the scope of the invention.

"Horizontal positioning" and "horizontal adjustment" as used herein involves movement to and away from the user, or front to back.

"Work surface" as used herein includes desks, flat commercially-available work surface or workstations, including, but not limited to single or multiple workstations, existing desks or tabletops, lectern or speakers' podiums, study carrels, library or classroom desks and tables, office or conference room work surfaces, tables, desks or modular work areas. The work surface could be contoured, horizontal to the floor, or angled. The work surface may also be portable, non-portable or fixedly attached to its location.

FIGS. 1-4 depict four views of a VESA compatible Mounting plate (6) attached to the support system of the present invention. The mount can use security screws (for example, IE HUDSON TPSS83206SBP) to attach the monitor. The VESA compatible Mounting plate fits both the VESA 100, and VESA 75, standard mounting hole patterns on flat panel displays. Mounting plate pivot point (15) is secured by two security screws to the Riser bar (3) which act as a tight pivot with friction damping washers in between. The Height set point (16) can use security screws to fixedly set the height. The Riser bar (3) can adjust up or down upon installation in the Riser bracket (2), and can be changed with tools to change the height for new equipment or for a new configuration. The rise bar can be tapped for security screws for both the VESA Mounting plate pivot point (15) and Height set point (16) on the Riser bracket (2). Optionally, the Riser bar (3) is channel shaped to contain the wires. The channel space in Riser bar (3) allows monitor signal and power wires to be contained in the channel to keep them secure and protect them from accidental damage. The Riser bracket (2) connects the Riser bar to the Extension bar (4). Mounting holes in the top flange of work surface Mounting bracket (23) allow the use of Mounting bracket screws (14) to fixedly mount the work surface Mounting bracket (23) (at the attachment end of the mounting system) to the underside of a Work-surface (7). Mounting holes in the top flange of Lock bracket detent rail (1) allow the use of Lock bar mounting screws (5) to fixedly mount the Lock bracket detent rail (1) to the underside of a Work-surface (7). The work surface Mounting bracket (23) and the Lock bracket detent rail (1) mount to the underside of a Work-surface (7). The mounting configuration is not limited to the underside of a work-surface.

Figure 3:
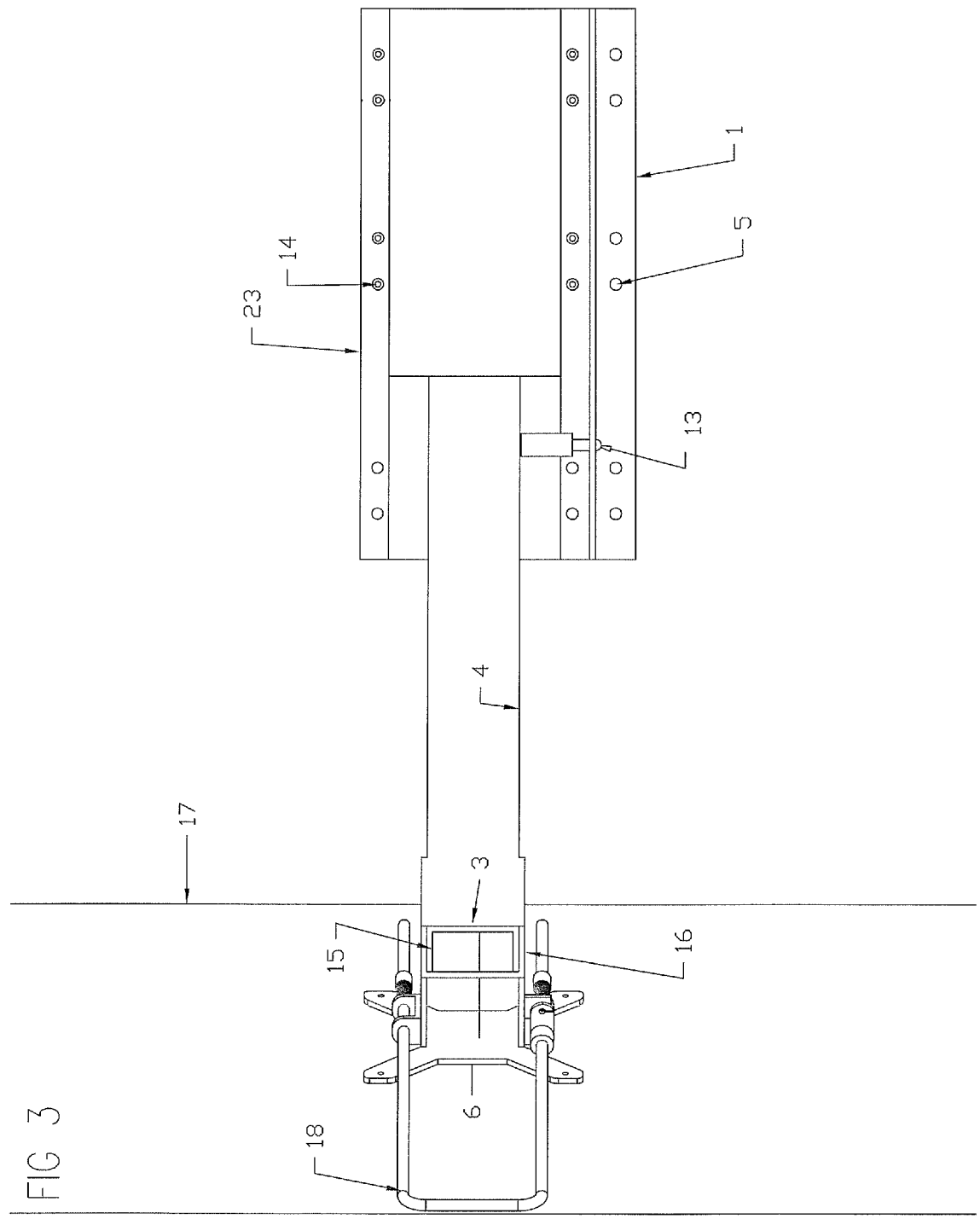
Figure 4:
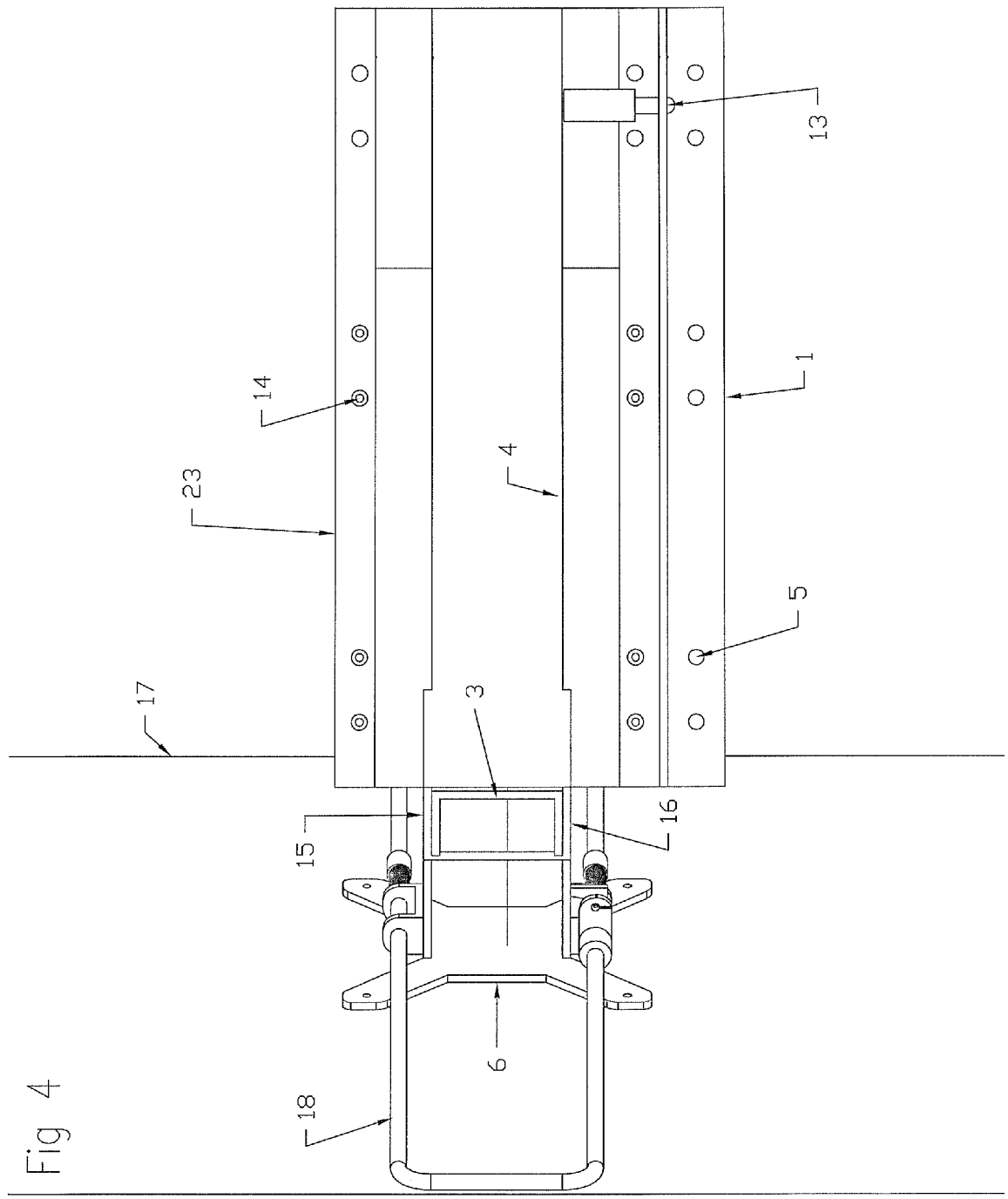
Figure 5:
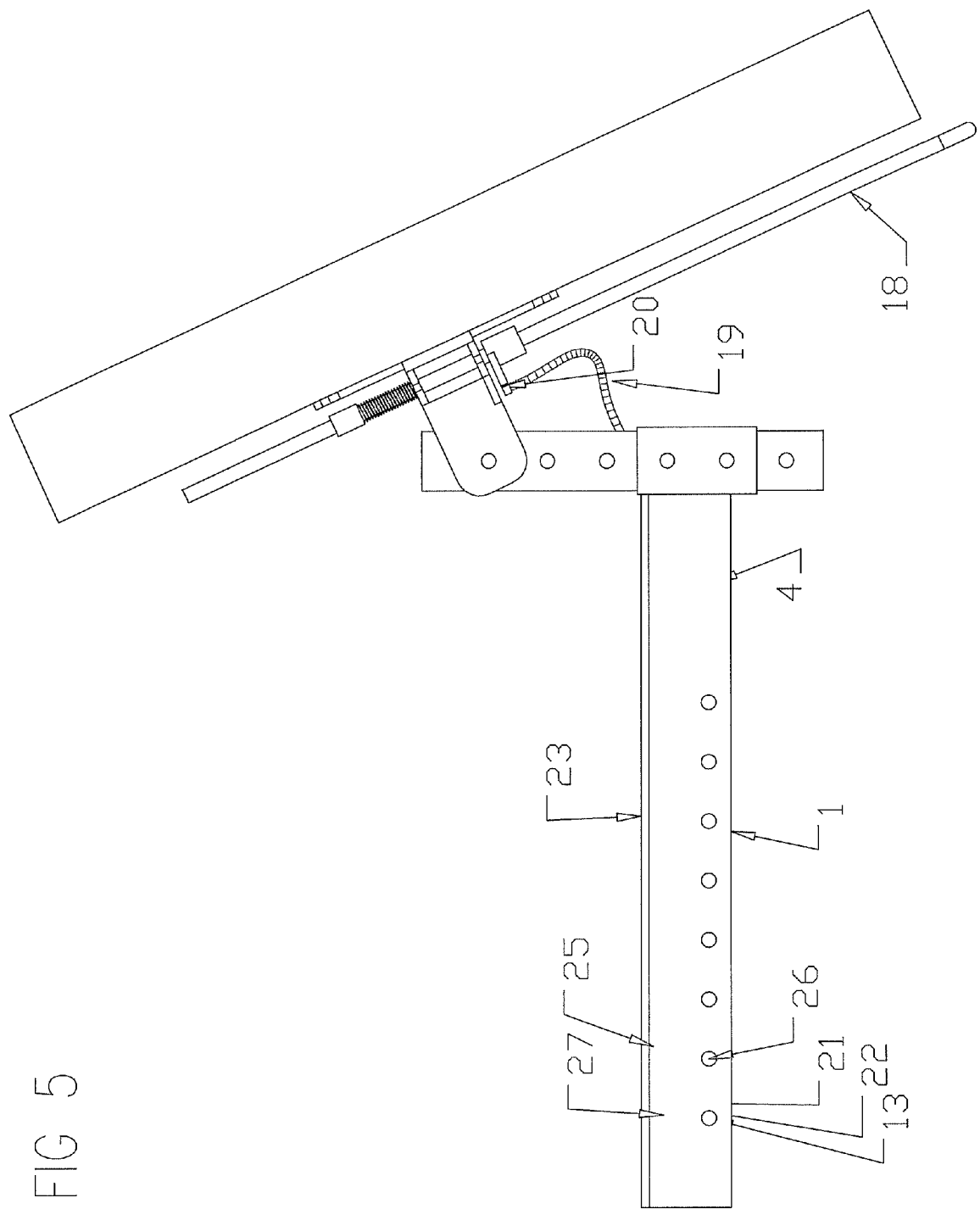
Figure 6:
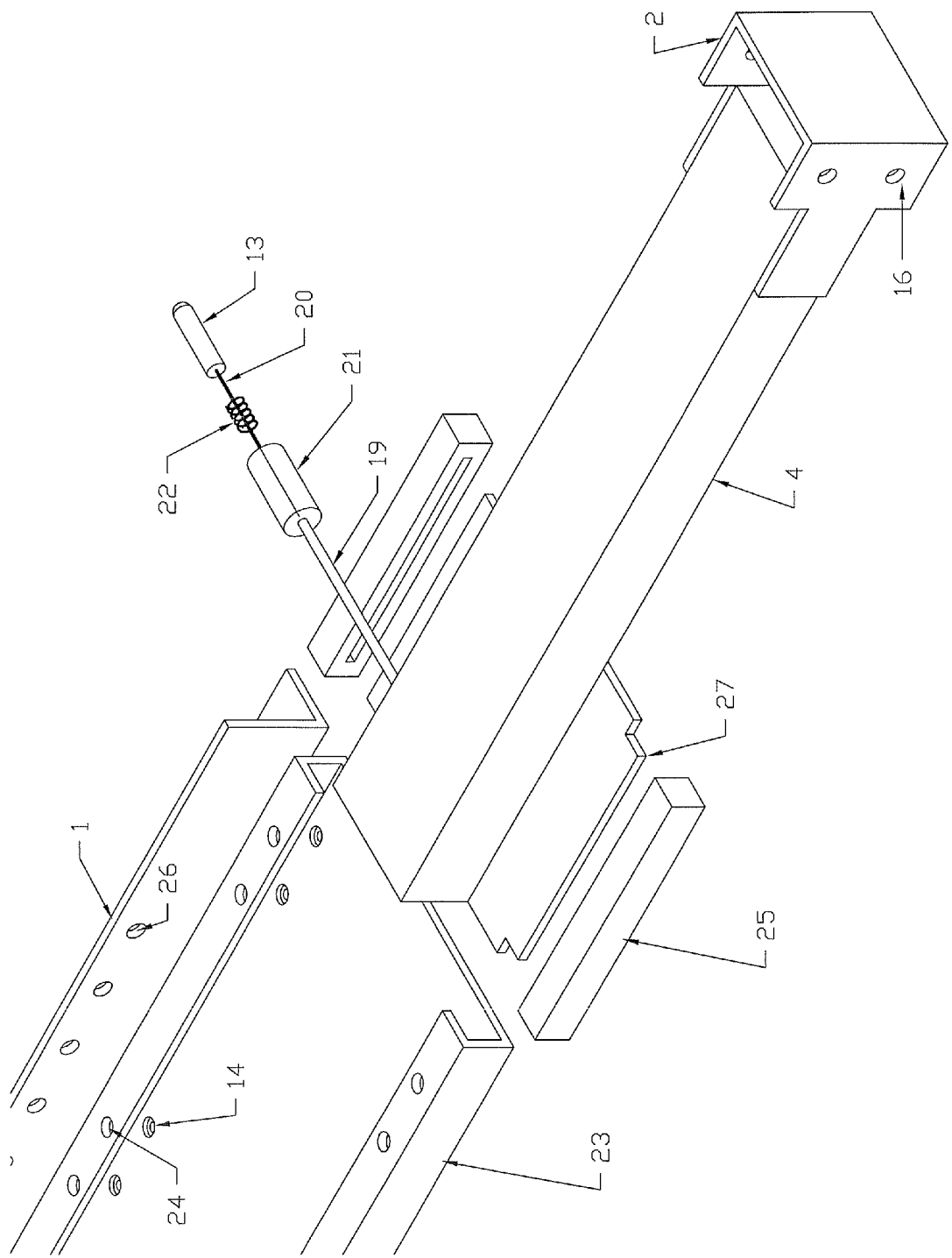

FIG. 5 shows details of the Horizontal adjustment lock release bar (18) and the attached Control cable sheath (19) which surrounds the Control cable (20) (hidden in this view, but shown in detail in FIG. 6). NOTE: FIGS. 3, 4 and 6 are shown from the bottom view for clarity but the design is not limited to this configuration. By moving the Horizontal adjustment lock release bar (18) the user can retract the Spring piston lock (13) releasing Extension bar (4) and allowing horizontal (front to back) adjustment of the display. As shown in FIG. 6 the Extension bar (4) is supported by Slide support wings (27) which fit into the slots in Slide bushings (25). The Horizontal adjustment lock is comprised of a Piston spring lock pin (13) activated by a Piston spring (22) contained in a Piston lock body (21) into a Locking detent (26) which, when released will lock the Extension bar (4) in place, providing a solid and stable connection for the mounted display, particularly necessary when the display is designed to be touched by the user. Side bushings (25) rest in the work surface Mounting bracket (23) to support and provide for a smooth movement for Extension bar (4). Side channel Mounting bracket screw (14) will be attached to the bottom of the work surface and Tool access holes (24) in the work surface Mounting bracket (23) allow access to drive the attachment screws into the bottom of the work surface. Height set point holes (16) in Riser bracket (2) are used in coordination with the openings in Riser bar (3) to insert a pin or security screw to adjust the vertical position of the Mounting plate (6) and to fix the assembly in place.

FIG. 6 in combination with FIG. 1 illustrate the user actuated mechanism whereby drawing down the Horizontal adjustment lock release bar (18), it slides the locking mechanism through the Adjustment bracket (10) compressing the Adjustment tension spring (9) against the Spring retention block (8) and the Piston spring (22) against the Spring piston lock housing (21). The Cable sheath bracket (12) slides down with the Horizontal adjustment lock release bar (18) which slides the Control cable sheath (19) away from the Control cable (20) which is fixedly attached to the Cable pull bracket (11). The control cable (20) retracts the Spring piston lock (13). When the user releases the Horizontal adjustment lock release bar (18) the Piston spring (22) and the Adjustment tension spring (9) reset the position of the Control cable (20) in the Control cable sheath (19) which allows the piston to slide into a Locking detent (26) located in the Lock bracket detent rail (1) locking the mechanism in place.

Figure 7:
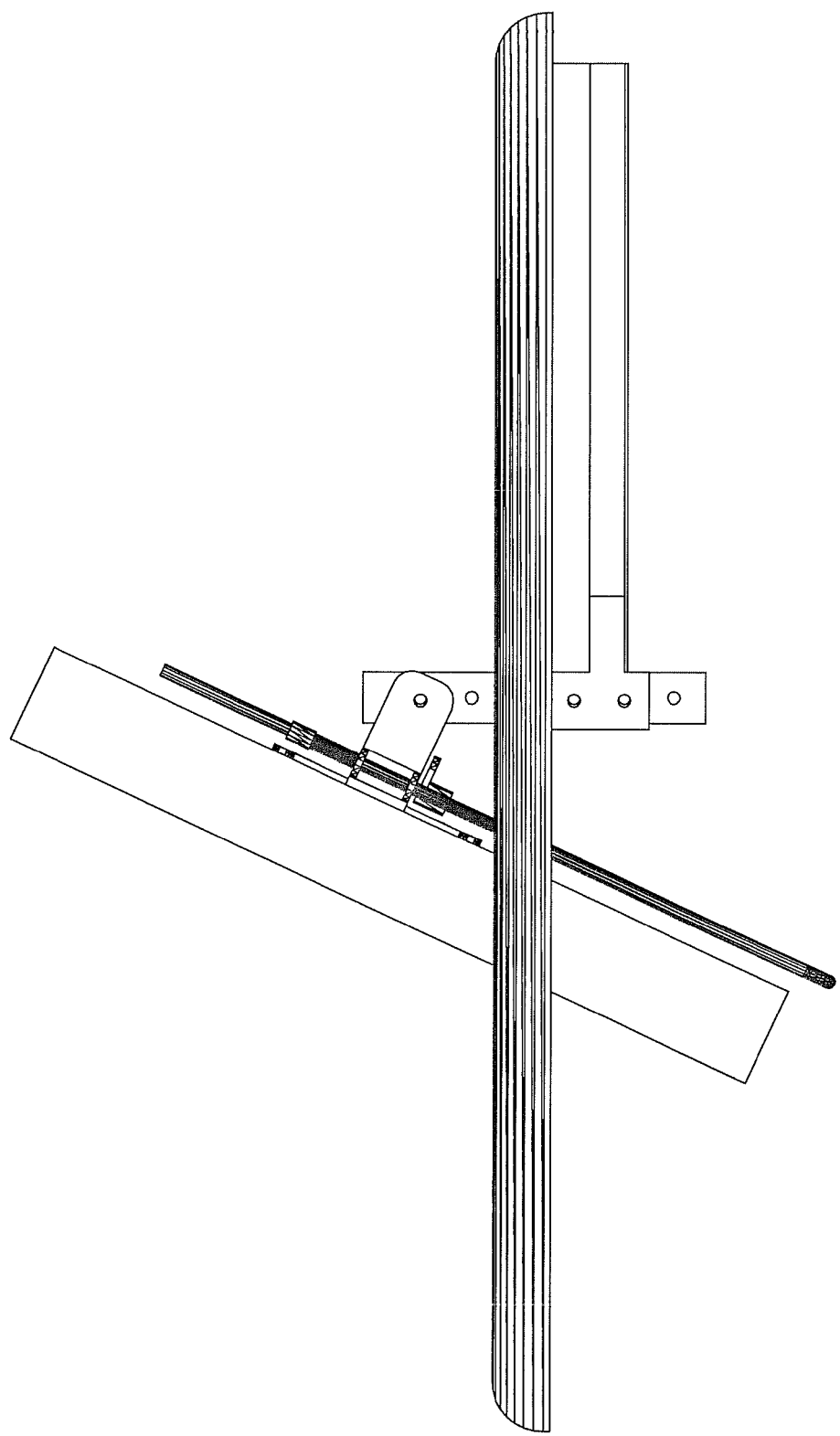
FIGS. 7-8 are isometric and side views of the device complete with display device and work surface, mounted in a semi-recessed position.
Figure 8:
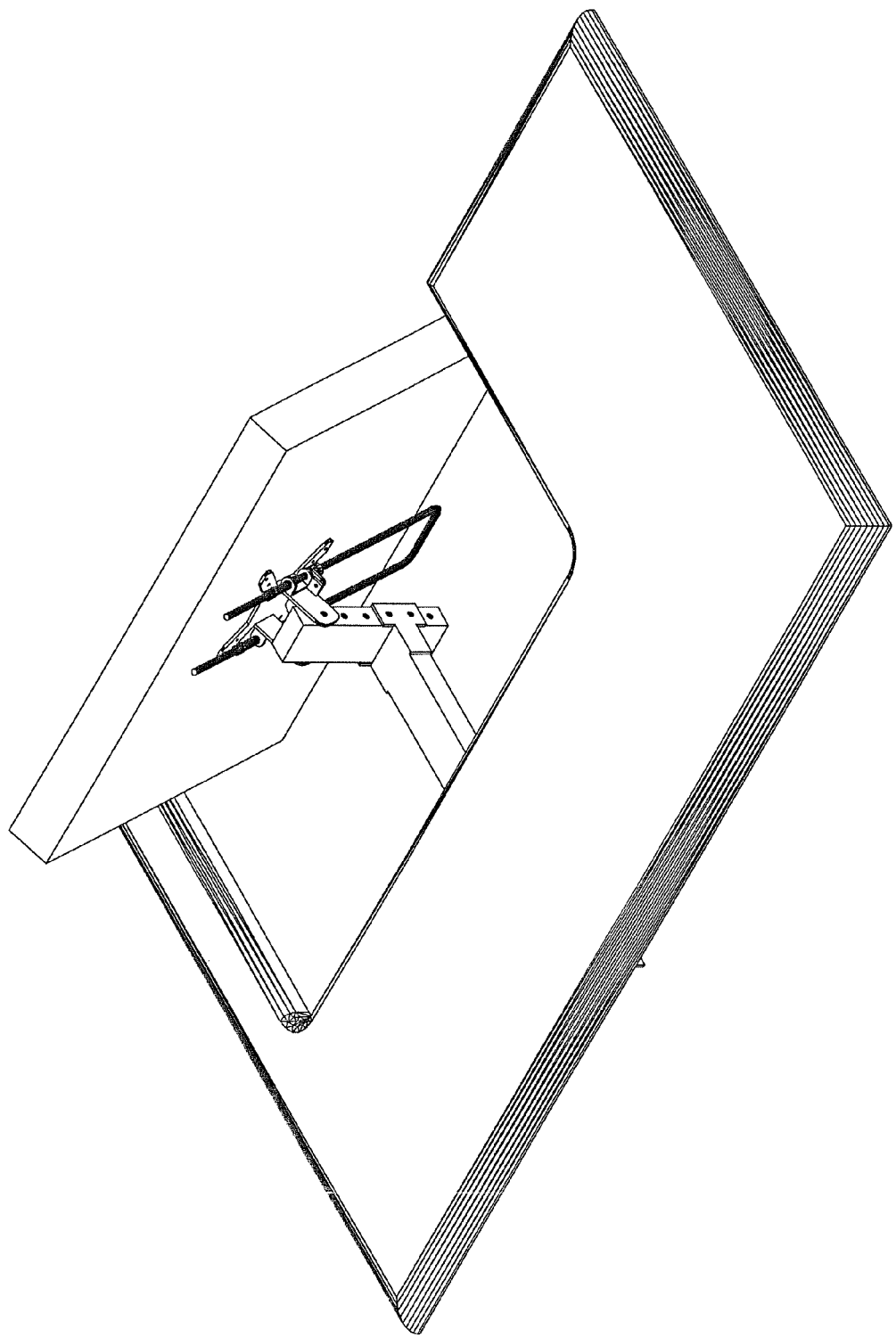

FIGS. 7-8 depict views of a monitor (17) mounted according to the invention in a semi-recessed mount, using simplified overall views. FIG. 7 is a side view and FIG. 8 is an isometric view.

Figure 9:
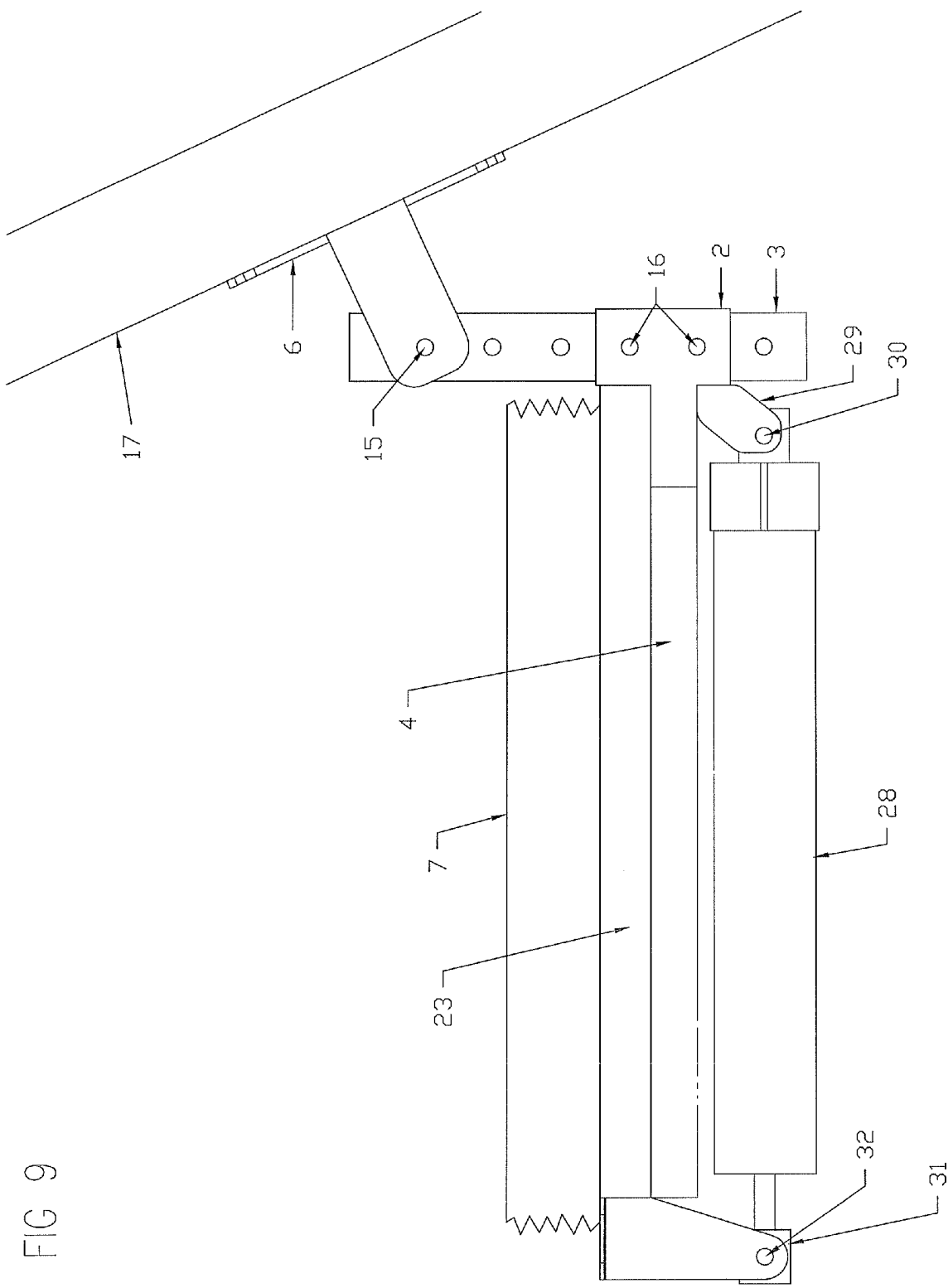
Figure 10:
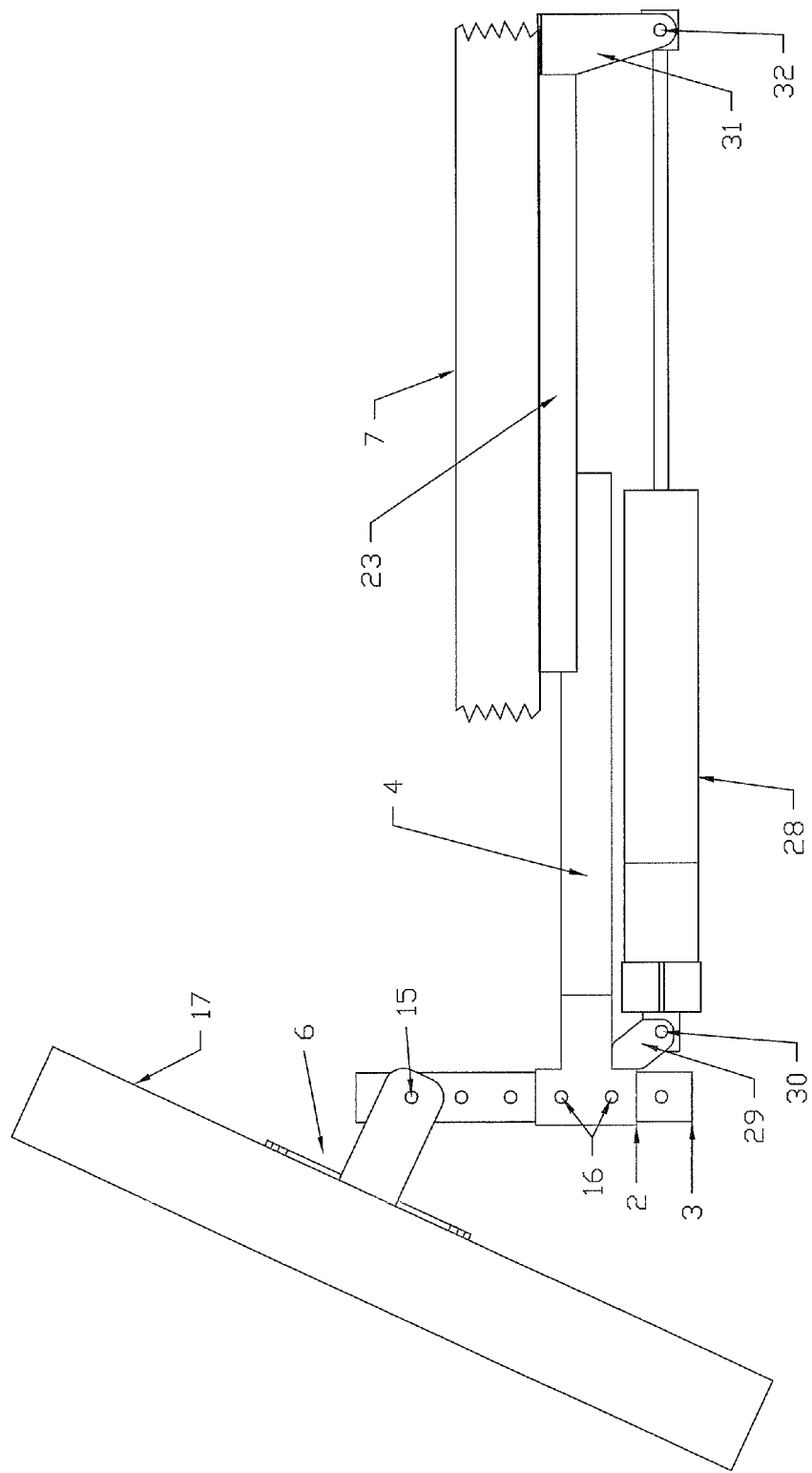

FIGS. 9-11 depict 3 views of a VESA compatible Mounting plate (6) attached to the support system of the (the mechanized version) of the present invention. The mount can use security screws (for example, IE HUDSON TPSS83206SBP) to attach the monitor. The VESA compatible Mounting plate fits both the VESA 100, and VESA 75, standard mounting hole patterns on flat panel displays. Mounting plate pivot point (15) is secured by two security screws to the Riser bar (3) which act as a tight pivot with friction damping washers in between. The Height set point (16) can use security screws to fixedly set the height. The Riser bar (3) can adjust up or down upon installation, and can be changed with tools to change the height for new equipment or for a new configuration. The Riser bar(3) can be tapped for security screws for both the VESA Mounting plate pivot point (15) and Height set point (16). Optionally, the Riser bar (3) is channel shaped to contain the wires. The channel space in Riser bar (3) allows monitor signal and power wires to be contained in the channel to keep them secure and protect them from accidental damage. Mounting holes in the top flange of work surface Mounting bracket (23) allow the use of Mounting bracket screws (14) to fixedly mount the work surface Mounting bracket (23) to the Work-surface (7). A Linear actuator (28) is connected to the Forward actuator mounting bracket (29) with an industry standard linkage at the Forward actuator pivot point (30). The Forward actuator mounting bracket (29) is also attached to the Riser bracket (2). The Linear actuator (28) is also connected to the Work-surface (7) with the Rear actuator mounting bracket (31) with an industry standard linkage at the Rear actuator pivot point (32) which allows the Linear actuator (28) to extend and retract the Extension bar (4).

Having now fully described this invention, it will be understood to those of ordinary skill in the art that the same can be performed within a wide and equivalent range of conditions, formulations, and other parameters without affecting the scope of the invention or any embodiment thereof. All patents and publications cited herein are incorporated by reference in their entirety.

I claim:

1. An articulated display support system for supporting a flat panel display affixed to a horizontal work surface comprising:
    a. a video display mounting plate for mounting said flat panel display which is pivotally attached to,
    b. a height position adjusting system including a riser bar which uses bolts to fixably set the height of said mounting plate and which is attached to,
    c. a horizontal position adjusting system including an extension bar that is slidably attached to a surface mounting bracket which allows limited movement in the horizontal direction and,
    d. a surface mounting bracket attached directly to the underside of said horizontal work surface with said mounting plate positioned such that the display, when positioned in the working position, is located in a semi-recessed position in an U-shaped cut-out with regard to the topside of said work surface.

2. The display support system of claim 1 wherein said horizontal position adjusting system can move horizontally by a user activating a mechanical switch which operates activates a mechanical positioning mechanism which when stopped securely fixes in place the horizontal position of the extension bar.

3. The display support system of claim 1 wherein said horizontal position adjusting system comprising a user activated switch which when activated allows horizontal movement but when released securely fixes in place the horizontal position of the extension bar.

4. The display support system of claim 1 wherein said height position system is comprised of a riser bracket containing openings and adapted to slidably receive said
    riser bar containing openings adapted to match said riser bracket openings and adapted to be fixed in a vertical position with bolts through both openings.

* * * * *